United States Patent [19]

Jones

[11] Patent Number: 5,055,686
[45] Date of Patent: Oct. 8, 1991

[54] RADIATION DETECTOR

[76] Inventor: Barbara L. Jones, 80 Chisbury Place, Forest Park, Bracknell, RG12 3TX, England

[21] Appl. No.: 474,345

[22] Filed: Feb. 2, 1990

[30] Foreign Application Priority Data

Feb. 3, 1989 [GB] United Kingdom ............... 89024434

[51] Int. Cl.⁵ ........................... G01T 1/24; G01T 1/00
[52] U.S. Cl. ............................. 250/370.01; 250/336.2
[58] Field of Search ................ 350/332, 334; 250/331, 250/332, 370.01, 370.05, 208.1, 390.01, 390.03, 336.1, 336.2; 340/765

[56] References Cited

U.S. PATENT DOCUMENTS

| | | | |
|---|---|---|---|
| 3,665,193 | 5/1972 | Kozlou et al. | 250/370.01 |
| 4,525,709 | 6/1985 | Hareng et al. | 350/332 X |
| 4,653,858 | 3/1987 | Seydlo et al. | 350/332 |
| 4,842,372 | 6/1989 | Toyama | 350/334 |
| 4,846,559 | 7/1989 | Kniffler | 350/334 X |
| 4,871,234 | 10/1989 | Suzuki | 350/334 X |
| 4,929,569 | 5/1990 | Yaniu et al. | 350/332 X |

Primary Examiner—Constantine Hannaher
Assistant Examiner—Edward J. Glick
Attorney, Agent, or Firm—Scully, Scott, Murphy & Presser

[57] ABSTRACT

A composite radiation detection and indicating device comprises first, third and fifth layers of a transparent conductive material, a second layer of semiconductive diamond between the first and third layers, and a fourth layer of liquid crystal material between the third and fifth layers. The layers are sandwiched together so that a diodic structure having a radiation-dependent charge storage characteristic is defined by the first, second and third layers, and a liquid crystal display element is defined by the third, fourth and fifth layers. The invention extends to a radiation detector including the composite device, together with an oscillator for applying a charge to the diodic structure, and a sensor for monitoring the decay of the stored charge. A voltage is applied to the liquid crystal display element to cause it to change state when the charge stored by the diodic structure decays below a predetermined limit.

11 Claims, 1 Drawing Sheet

RADIATION DETECTOR

BACKGROUND OF THE INVENTION

This invention relates to a radiation detector which is sensitive to nuclear radiation.

SUMMARY OF THE INVENTION

According to the invention a composite radiation detection and indicating device comprises first, third and fifth layers of a transparent conductive material, a second layer of transparent semiconductive material between the first and third layers, and a fourth layer of liquid crystal material between the third and fifth layers, the layers being sandwiched together so that a diodic structure having a radiation-dependent charge storage characteristic is defined by the first, second and third layers, and a liquid crystal display element is defined by the third, fourth and fifth layers.

The transparent semiconductive material preferably comprises diamond.

The transparent conductive material may be, for example, tin oxide.

Further according to the invention radiation detection apparatus comprises a composite radiation detection element of the invention, bias means for applying a predetermined charge to the diodic structure of the composite device, monitoring means for monitoring the decay of the stored charge, and means for applying a voltage to the liquid crystal display element to cause it to change state when the charge stored by the diodic structure decays below a predetermined limit.

The bias means may be adapted to charge the diodic structure repetitively at a predetermined rate, the monitoring means being adapted to be reset at the same rate, so that the monitoring means effectively measures the rate of decay of the charge stored by the diodic structure.

The monitoring means preferably comprises a MOSFET transistor having a very high input impedance, so that the charge storage characteristics of the diode are not substantially affected thereby in use.

DESCRIPTION OF AN EMBODIMENT

Figure 1:
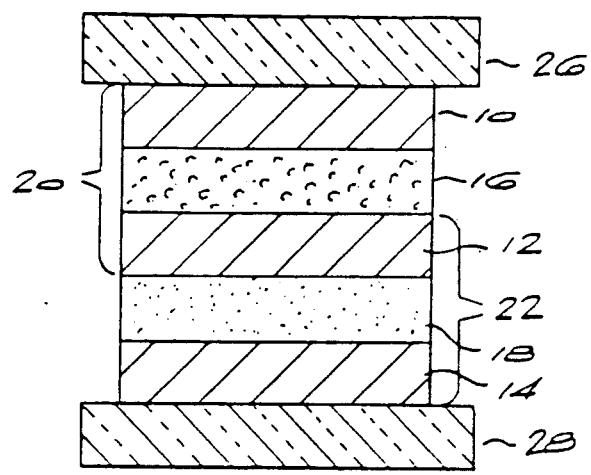
FIG. 1 is a schematic illustration of the construction of a composite radiation detection and indicating device according to the invention.

The composite radiation detection and indicating device illustrated in FIG. 1 comprises three layers 10, 12 and 14 of tin oxide ($SnO_2$). Sandwiched between the layers 10 and 12 is a diamond layer 16, and sandwiched between the layers 12 and 14 is a layer 18 of liquid crystal material. The layers 10, 16 and 12 together define a back-to-back diodic structure 20, while the layers 12, 18 and 14 together define a liquid crystal display element 22. Outer protective layers 26 and 28 of transparent glass protect and support the diode/display structure, making it sufficiently rigid to be self-supporting. The choice of diamond for the layer 16 is determined by the fact that a substantially transparent semiconductive layer is readily provided using diamond. However, other transparent semiconductive materials could be used instead.

It should be appreciated that the illustration of FIG. 1 is purely schematic and is not to scale. Typically, the radiation detection element has a width of 5 mm, with a diamond layer 16 of approximately 10 $\mu$m thickness, while the liquid crystal layer 18 has a typical thickness of 7 $\mu$m.

The diodic structure 20 has an effective capacitance which is determined by the characteristics of a depletion layer at the diode junction. If the diodic structure is biased electrically and then left open circuit, a charge is stored by this capacitance. The stored charge decays very slowly in the absence of nuclear radiation or a current leakage path. However, when radiation is incident on the diode junction, electron/hole pairs are generated at a rate which is proportional to the intensity of the incident radiation, and the stored charge is dissipated at a corresponding rate.

Figure 2:
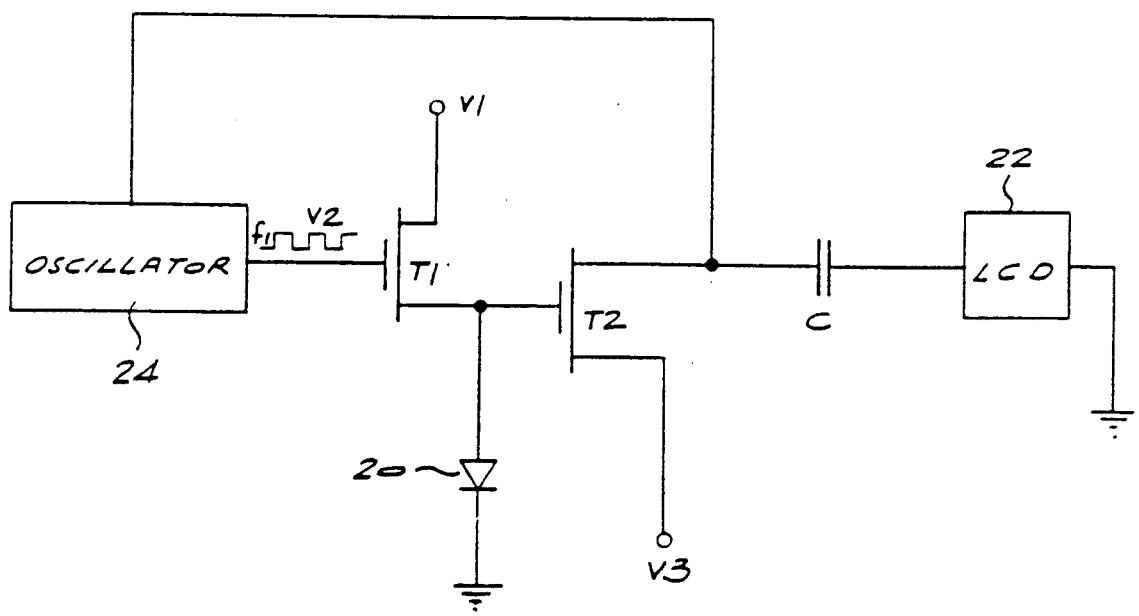
FIG. 2 is a schematic circuit diagram of radiation detection apparatus according to the invention.

The circuit illustrated schematically in FIG. 2 shows the diodic structure 20 and the liquid crystal element 22 as independent circuit elements. This is made possible because the common "terminal" of the two devices, formed by the tin oxide layer 12, is effectively at earth or ground potential in both devices. The illustrated circuit includes a pair of MOSFET transistors T1 and T2. It is particularly important that the transistor T2 should have a high input impedance. The source of the transistor T1 is held at a constant negative voltage V1, so that when the transistor is on, the diodic structure 20 is reverse biased. A square waveform V2 is applied to the gate of the transistor T1 by a variable oscillator circuit 24, which generates a square waveform at a selected frequency $f_1$ and having a desired duty cycle. This effectively switches the transistor T1 on and off at a predetermined rate, repetitively applying a predetermined charge to the diodic structure 20 via the layer 10.

The transistor T2 acts as a monitoring or sampling device for monitoring the level of charge on the diodic structure 20. The high input impedance of this transistor ensures that it does not bleed off a significant amount of charge from the diodic structure. The drain of the transistor T2 is held at constant voltage V3 which is greater than 2 V. The drain of the transistor T2 is connected via a capacitor C to the layer 14 of the liquid crystal display element 22.

When the diodic structure 20 is subjected to nuclear radiation, its stored charge is dissipated at a rate proportional to the intensity of the incident radiation. As the level of charge reduces, the transistor T2 begins to turn on, allowing the capacitor C to charge towards the voltage V3. As the voltage on the capacitor approaches 2 V, the liquid crystal display element 22 will turn on (that is, darken) indicating that a predetermined radiation intensity is being detected.

As illustrated, the oscillator circuit 24 will reset the liquid crystal display and re-charge the diodic structure at the oscillator frequency $f_1$. This means that if the intensity of the incident nuclear radiation is below a level determined by, inter alia, the oscillator frequency $f_1$, the diodic structure will be recharged before it discharges sufficiently to activate the display. Effectively, therefore, the rate of decay of the charge stored by the diodic structure is measured. It is also possible to provide a latching circuit which will keep the liquid crystal display turned on for a desired length of time after a predetermined radiation level has been detected.

The described radiation detection indicating element can be manufactured as a single device due to the fact that the diamond layer 16 is transparent and does not obscure the liquid crystal layer 18.

Due to its relatively small size and thickness, the device can be incorporated in a credit-card sized personal radiation detector, for example. In such an application, the associated electronic components can be placed or formed directly on the substrate of the card, for example, by thin-film technology. Alternatively, of course, discrete electronic components can be used. Another application of the device is in a "wrist-watch" type of radiation detector, in which the device of the invention is incorporated in a small housing with a strap attached thereto.

I claim:

1. A composite radiation detection and indicating device comprising first, third and fifth layers of a transparent conductive material, a second layer of transparent semiconductive radiation-sensitive material between the first and third layers, and a fourth layer of liquid crystal material between the third and fifth layers, and layers being sandwiched together so that a diodic structure having a radiation-dependent charge storage characteristic is defined by the first, second and third layers, and a liquid crystal display element is defined by the third, fourth and fifth layers, said first, second, third, fourth and fifth layers providing a substantially transparent device.

2. A composite device according to claim 1 wherein the transparent semiconductive material comprises diamond.

3. A composite device according to claim 1 wherein the transparent conductive material comprises tin oxide.

4. A composite device according to claim 1 wherein protective layers of glass are applied to the outer surfaces of the device.

5. Radiation detection apparatus comprising a composite radiation detection and indicating device according to claim 1, and further comprising bias means for applying a predetermined charge to the diodic structure of the composite device, monitoring means for monitoring the decay of the stored charge, and means for applying a voltage to the liquid crystal display element to cause it to change state when the charge stored by the diodic structure decays below a predetermined limit.

6. Radiation detection apparatus according to claim 5 wherein the bias means is adapted to charge the diodic structure repetitively at a predetermined rate, the monitoring means being adapted to be reset at the same rate, so that the monitoring means effectively measures the rate of decay of the charge stored by the diodic structure.

7. Radiation detection apparatus according to claim 6 wherein the bias means includes an oscillator operating at a predetermined frequency and duty cycle.

8. Radiation detection apparatus according to claim 7 wherein the bias means further includes switch means for applying the oscillator output to the diodic structure to charge the diodic structure.

9. Radiation detection apparatus according to claim 8 wherein the switch means comprises a MOSFET transistor.

10. Radiation detection apparatus according to claim 9 wherein the monitoring means comprises a MOSFET transistor having a very high input impedance, so that the charge storage characteristics of the diodic structure are not substantially affected thereby in use.

11. Radiation detection apparatus according to claim 5 wherein the third layer of the composite device serves as a common terminal of the diodic structure and of the liquid crystal display element.

* * * * *